United States Patent [19]

Jordan et al.

[11] Patent Number: 5,867,515
[45] Date of Patent: Feb. 2, 1999

[54] HALIDE GLASS COMPOSITIONS

[75] Inventors: Wayne George Jordan, Berkshire; Animesh Jha, Uxbridge; Steven Terrence Davey, Ipswich, all of United Kingdom

[73] Assignee: British Telecommunications public limited company, London, England

[21] Appl. No.: 507,374

[22] PCT Filed: Feb. 22, 1994

[86] PCT No.: PCT/GB94/00346

§ 371 Date: Oct. 5, 1995

§ 102(e) Date: Oct. 5, 1995

[87] PCT Pub. No.: WO94/19242

PCT Pub. Date: Sep. 1, 1994

[30] Foreign Application Priority Data

Feb. 22, 1993 [EP] European Pat. Off. .............. 93301266
Sep. 2, 1993 [EP] European Pat. Off. .............. 93306938
Sep. 2, 1993 [EP] European Pat. Off. .............. 93306939

[51] Int. Cl.$^6$ ..................................................... H01S 3/17
[52] U.S. Cl. ......................... 372/40; 372/6; 252/301.4 H
[58] Field of Search ................... 372/6, 41, 40; 252/301.4 H; 385/122

[56] References Cited

U.S. PATENT DOCUMENTS 5,251,062 10/1993 Snitzer et al. ............................... 372/6
5,309,452 5/1994 Ohishi et al. ............................... 372/6
5,351,335 9/1994 Ohishi et al. ........................... 395/122
5,560,868 10/1996 Jordan et al. .................... 252/301.4 H

FOREIGN PATENT DOCUMENTS

A 0 535 798   4/1993   European Pat. Off. .
A 0 568 076  11/1993   European Pat. Off. .
A 60-027 621  2/1985   Japan .
A 63-011 456  1/1988   Japan .
WO A 92 07802  5/1992   WIPO .

*Primary Examiner*—Leon Scott, Jr.
*Attorney, Agent, or Firm*—Nixon & Vanderhye P.C.

[57] ABSTRACT

This invention relates to halide glasses which have particular utility as hosts for rare earth elements in order to provide optical amplification by laser activity. The glasses are characterized in that the metal content is similar to conventional ZBLAN glasses except that it has been discovered that the replacement of Al by Y and In and the use of more than one alkali metal fluoride, e.g., NaF, CsF and LiF, has synergistic benefits. The synergistic benefits are good lasing performance (due to the low content of aluminum) and good stability in spite of the low content of aluminum. $Pr^{3+}$ constitutes a good lasing species for amplifying telecommunications signals at 1300 nm using pump radiation at 1020 nm.

24 Claims, No Drawings

HALIDE GLASS COMPOSITIONS

BACKGROUND OF THE INVENTION

1. Field of the Invention

This invention relates to halide glass compositions and more particularly to halozirconate glass compositions which, have good properties as hosts for rare earth elements as lasing dopants.

2. Related Art

It has long be recognised that the rare earth elements display fluorescence and this fluorescence can be utilised in the form of lasing either for the generation of optical signals or for the amplification of optical signals. Usually the lasing species is a trivalent ion of a rare earth element. In particular the trivalent ion $Pr^{3+}$ (praseodymium) constitutes a lasing species for providing radiation at 1300nm. This property is of interest because optical telecommunications uses signals at 1300nm and the ion $Pr^{3+}$ is capable of amplifying such signals by laser action. It will be apparent that, in order to take advantage of this property, it is necessary to provide the active species in a suitable waveguiding structure, eg. a fibre waveguide.

While the element Pr is of particular interest for telecommunications it should be recognised that all the rare earth elements are capable of lasing at a variety of different wavelengths for a variety of different purposes. In other words the lasing properties extend throughout the group of rare elements and there is, therefore, general interest in providing all of the rare earth elements as lasing species in suitable host glasses.

The halide, eg fluoride, glasses have been recognised since 1978 and a wide range of compositions have been reported and their properties studied. It has been recognised that the halide glasses form good hosts for the rare earth elements as lasing species but the identification and selection of compositions having favourable properties remains difficult. In particular the prior art has failed to identify the glass compositions capable of lasing at 1300 nm with sufficient efficiency for use in telecommunications networks. This invention relates to compositions which have good properties. It is now convenient to discuss the properties of the class required in a lasing device such as a fibre amplifier. These properties will be considered under three different headings.

General Glass Properties

It is important that all glasses shall remain in the glass state, ie. they shall not devirtify under condition of use. It is also important that the glasses shall not be subject to crystallisation which might be considered as incipient devitrification. In addition it is also necessary that the compositions shall be suitable for use in glass forming and further processing. In particular it is necessary that a composition be stable in the melt, that it shall be capable of withstanding practical cooling rates and the conditions necessary for fibre forming, eg. during the pulling of a fibre preform into a fibre. It will also be apparent that chemical stability of the various glass components is important, eg it is desirable to avoid water soluble ingredients and, even more important, to avoid hygroscopic ingredients.

Attenuation

Lasing devices usually include waveguiding structures and it is clearly important to avoid unnecessary attenuation of either the signal wavelength or the pump wavelength. The requirement for low attenuation means that it is desirable to avoid components which have unnecessarily high absorptions at wavelengths of interest. It is also necessary to avoid scatter which emphasises some of the fundamental glass properties, ie. that the glass shall not form crystals even on a small scale.

Host Properties

It also appears that there is interaction between the host glass and the lasing species. For example, the lasing species may undergo what is often called "non-radiative decay". This implies that the lasing species looses energy other than by the intended lasing transitions. Non-radiative decay represents a loss of energy and it is, therefore, an undesirable effect. It appears that the host glass may participate in non-radiative decay either in the sense that it may assist this undesired effect or help to inhibit it. Nevertheless, whatever the reason, it is established that the host glass can affect the efficiency of the lasing process and it is desirable to select the host so as to achieve good lasing efficiencies.

The hosting properties of the glass appear to have substantial effects upon the efficiency of a laser, eg. the ratio of signal power output to pump power input. This efficiency is of substantial importance in telecommunications because it may define the available gain of an amplifier. In experimental work, it is often convenient to utilise the lifetime of the excited state as a measure of the efficiency; the two quantities can be regarded as proportional to one another. In some theoretical papers it is considered that the multi-phonon absorption of the host affects the lifetime of the excited state and hence the efficiency of lasers based thereon.

It is important to recognise that the selection of a lasing composition, and especially the host glass, must take into account all of these features. Thus it is not necessarily appropriate to select ingredients solely on the basis of their effect upon the lasing performance if these components are liable to give rise to glass instability and high attenuations (which high attenuations may be the result of glass instability). In other words, selecting on the basis of one desirable feature is unlikely to produce acceptable results if this selection is accompanied by adverse effects.

It has been mentioned that the prior art has disclosed and evaluated a very wide range of different halide (fluoride) glasses. This range includes a well recognised group usually known as fluorozirconates. This sub-group of fluoride glasses has been recognised because its members perform well in respect of all of the above features. The chemical composition of the fluorozirconate glasses will now be described.

The major component is $ZrF_4$ which usually constitutes about 40–65 mole % of the total composition. In some variants the content of $ZrF_4$ is reduced in order to adjust the refractive index, eg. by incorporating $PbF_2$ or $HfF_2$. (Refractive index adjustment is important in the design of waveguiding structures). A fluorozirconate composition usually contains about 10–39, eg. 15–25, mole % of an alkali metal fluoride, usually NaF. In addition, the composition often contains a substantial amount, eg. 10–mole % of $BaF_2$ with smaller amounts, eg. 2–6 mole %, of $LaF_3$ and $AlF_3$. It is emphasised that the halide content of a fluorozirconate glass is entirely fluoride. In the case of a lasing composition, the fluorozirconate host will also contain up to 4 wt % of the cation of a rare earth metal, eg 0.001 to 0.1 wt % (ie 10–1000 ppm. wt) of $Pr^{3+}$.

SUMMARY OF THE INVENTION

It has now been unexpectedly discovered that the aluminium, which is conventional in halozirconate glasses, tends to affect adversely the fluorescence and lasing properties of dopants such as rare earth metals, eg $Pr^{3+}$. This invention, which is more fully detailed in the claims, consists in the use of halozirconate glasses which contain less than 0.2% mole of aluminium, preferable less than 0.1% mole of aluminium and most preferably no aluminium.

The use of low, as defined above, aluminium concentrations has an adverse effect on the stability of the glass and this invention comprises two modifications each of which improves the stability of low aluminium glasses. Either one of the said modifications by itself is beneficial but it is preferred to incorporate both, especially in glasses which contain no aluminium.

According to the first modification the composition contains at least two, and preferably three, halides of different alkali metals, eg halides of Na, Li and Cs.

According to the second modification the composition contains a halide of indium or yttrium, preferably both.

Compositions which contain only a small amount, e.g. 0.05 to 0.15% of aluminium halide will show a small loss of lasing performance but the Al helps to stabilise the composition and only one of the two modifications may be needed, e.g. the use of In and/or Y (with only one alkali metal).

To obtain maximum lasing performance it is preferable to have no aluminium present and, in order to achieve good stabilities, it is recommended to use both modifications, e.g. to have both In and Y halides present and also to have halides of at least two of the alkali metals Na, Cs and Li present.

Where In and Y are both present the relative molar quantities are preferably:

Mole ratio In: Y=1:3 to 3:1, eg 1:1

Where Na and Cs are both present the relative molar quantities are preferably:

Mole ratio Na:Cs=5:1 to 1:3, especially 3:1 to 1:2, eg. 1:1.

The halide content of the low aluminium glass is conveniently all fluoride. However particularly good lasing has been achieved wherein up to 10% weight, eg 1–5% weight preferably 3–4% weight of the total lost composition is produced as chloride with the remainder of the halide provided as fluoride.

The invention includes not only the novel glasses described above but also:

(i) waveguiding structures, eg fibres, made from the glasses, especially waveguiding structures having path regions made of the glasses; and (ii) signal generators and photonic amplifiers utilising the glasses to support lasing activity.

DETAILED DESCRIPTION OF EXEMPLARY EMBODIMENTS

Three compositions in accordance with the invention will now be described by way of example. In addition, three more compositions will also be described to provide a basis of comparison. These six compositions are defined in Table 1.

These compositions were made by conventional preparative techniques, e.g. mixing the powered ingredients in a crucible, melting and casting. All processes were carried out under clean, dry atmospheres such as $N_2$ or A. Oxygen may be present during part of the melting. A suitable technique is described in EP 170380. A small amount of NH4H-2 was added to fluorinate residual oxides (~0.5 g). The batch was then heated in a Pt/Au crucible under flowing N2 at 400 C. for 1 hr, the temperature was raised to 850 C. and the glass was further heated under $O_2$ for 2 hrs to oxidise the melt, this is followed by a further 1 hr at a lower temperature of 670C., before casting. The casting was performed under partial vacuum lower with a flow of dry N2 to prevent bubble formation. A partial vacuum also applied during the glass melting process whilst the melt was at 670° C.

Similar preparative technique apply to mixed halide (fluaoro/chloro) glasses, e.g a suitable proportion of the reactants is provided as chloride. Fluorinating agents, e.g. NH4HF2, should be avoided as there is a risk of converting chloride into fluoride.

TABLE 1

| | Fluorozirconate Compositions (mole %) | | | | | | | | |
|---|---|---|---|---|---|---|---|---|---|
| Acronym | ZrF4 | BaF2 | LaF3 | AlF3 | YF3 | InF3 | NaF | CsF | λ |
| ZBLAN | 52 | 20 | 4 | 4 | — | — | 20 | — | 7.05 |
| ZBLYIN | 52 | 20 | 4 | — | 2 | 2 | 20 | — | 7.23 |
| ZBLAC | 55 | 22 | 4 | 4 | — | — | — | 15 | 7.10 |
| ZBLYIC | 55 | 22 | 4 | — | 2 | 2 | — | 15 | 7.36 |
| ZBLANC | 52 | 20 | 4 | 4 | — | — | 10 | 10 | 7.10 |
| ZBLYINC | 52 | 20 | 4 | — | 2 | 2 | 10 | 10 | 7.35 |

The compositions ZBLAN, ZBLAC and ZBLANC all contain 4% of $ALF_3$ and, therefore, they represent the prior art. ZBLYIN and ZBLYIC represent the first modification whereas ZBLY:NC represents a preferred embodiment showing both modifications.

In addition to the ingredients specified in Table 1 the compositions also contain 500 ppmw of Pr3+, based on the other ingredients. The Pr3+ is an active dopant capable of supporting lasing and amplifying activity.

The columns headed λ in Tables 1 gives the wavelength in micrometers which represents the limit of infra red transmission for the relevant composition. The composition will transmit at wavelengths shorter than λ but attenuation is very high at wavelengths longer than λ. (λ is usually known as the "infra red cut off").

Some theorists consider that the multi-phonon absorption properties of a glass affect many of its optical properties. For example it is considered that multi-phonon absorption affects the infra red cut off (ie. λ as quoted in Table 1) and also the interaction with lasing processes taking place within the glass. We note that in Table 1 the Al-free compositions exhibit a longer infrared cut off then the traditional fluorozircontate glasses.

Before quoting numerical values it is appropriate to establish certain qualitative comparisons.

The halides of Zr, Ba and La are the primary glass forming constituents and these three halides constitute about 75 mole % of the composition. These three metals can be partially replaced by other metals, eg. Hf, in order to adjust refractive index to provide waveguiding structures.

Conventional fluorozirconate glasses contain AlF3 but this can be replaced with halides of indium and yttrium with beneficial effects as set out quantitatively below.

Alkali metal halides are required to provide a stable glass composition and this is usually provided as NaF. The replacement of Na by Cs has been proposed but (in conventional systems) we have found that this replacement can result in a significant decrease in the stability of the glass. In conventional systems, therefore, it is not considered desirable to replace Na by Cs.

Three important performance parameters were measured for the glass compositions quoted defined in Tables 1 and the results are quoted in Table 2.

TABLE 2

| Acronym | Life ($\mu$s) | Stability | Tx-Tg |
|---|---|---|---|
| ZBLAN | 107 | 6.74 | 92 |
| ZBLYIN | 126 | 3.41 | 83 |
| ZBLAC | 106 | 4.21 | 70 |
| ZBLYIC | 120 | 2.48 | 70 |
| ZBLANC | 108 | 3.26 | 71 |
| ZBLYINC | 134 | 6.77 | 90 |

The column headed "life" in Table 2 gives the fluorescence lifetime of the $Pr^{3+}$ in the specified host. The fluorescence was stimulated by pump radiation at 1020 nm provided with an Ar+ pumped Ti: sapphire laser. The lifetime specifies the rate of decay of fluorescence after the pump has been switched off. The fluorescence is at 1300 nm and it corresponds to the lasing transitions ($^1G_4 - ^3H_5$) which would be needed in a telecommunications amplifier operating at this wavelength. The efficiency of the laser is proportional to the lifetime.

The other two columns, headed "stability" and "$T_x-T_g$"of both relate to the stability of the glass. More specifically three glass parameters are involved, these are:

$T_g$=the glass transition temperature,
$T_x$=temperature of onset of crystallisation.
$T_p$=temperature of peak crystallisation
The "stability", represented as S, is calculated as:
S=[($T_p-T_x$) ($T_x-T_g$) ]/$T_g$ $T_g$ and $T_x$ and $T_p$ were all read off from differential scanning calorimetry curves obtained using an isochronal heating rate of 20° C./minute. The stability and ($T_x-T_g$) are parameters which represent the thermal stability of the glass and the higher the parameter the better. However the overall properties which make a glass suitable for using in a waveguide are even more complicated and the stability parameter represents only one important feature of the overall performance.

Table 2 shows that simply replacing Al by In an Y in the traditional fluorozirconate glass (ZBLAN) has the desirable effect of increasing the $Pr^{3+}$ $^1G_4$ lifetime.

However, this is accompanied by a reduction in glass stability. Thus fibres containing a core of ZBLYIN glass will have greater optical loss, due to the formation of higher concentration of scattering centres, than a traditional ZBLAN fibre. Table 2 also shows that replacing Na with Cs in both the traditional fluorozirconate glass and the Al-free compositions has little effect on the lifetime of the dopant but this reduces the stability of the glass further. Most surprisingly, however, we have found that by mixing Na and Cs the Al-free fluorozirconate glass stabilised. Furthermore, there seems to be a synergistic enhancement of the donant lifetime. Thus a fibre containing a doped core made of Al-free fluorozirconate glass containing mixed alkali metal fluorides and also fluorides of In and Y will have similar levels of optical loss as a fibre composed of traditional fluorozirconate glass. Thus the benefits arising from an enhanced lifetime of the dopant can be exploited without degradation of the device performance through enhanced optical loss.

The glass compositions according to the invention contain $Pr^{+3}$ as the lasing dopant and they are useful in amplifiers for telecommunications signals at a nominal wavelength of 1300 nm. Such signals have a band width which usually extends as low as 1260 nm and/or as high as 1340 nm. Signals with this nominal wavelength can be amplified using the lasing transition $^1G_4 \rightarrow ^3H_5$ and the $Pr^{+3}$ is pumped using a nominal wavelength of 1020 nm, e.g. using the band 960–1080 nm.

In the compositions specified in Table 1 (above) all of the halide content is provided as fluoride. The results quoted in Table 2 and discussed above therefore relate to all-fluoride systems.

It has been found that changing some of the fluoride into chloride has beneficial effects. The amount changed should not result in the chloride content of the total composition missing above about 10% by weight. Where chloride is present, concentrations of 1–5% by weight, eg 3–4% weight, based on the total composition are preferred.

In the ranges specified, the presences of chloride appears to enhance the lasing benefits, eg the fluorescence lifetime of $Pr^{3+}$ is increased.

However particularly good effects have been achieved for $Pr^{3+}$ in a host having the following features:
  (a) No aluminium content
  (b) yttrium and indium, preferably in ecuimolar quantities, to replace the aluminium,
  (c) alkali metal content provided as sodium and caesium preferably in equimolar quantities
  (d) chloride content of 2–5% weight.

These four features interact so as to give not only high fluorescence lifetimes but good stability.

In order to illustrate this effect the (all fluoride) composition designated ZBLYINC in Tables 1 and 2 was modified by providing some of the fluoride content as chloride such that the amount of chloride is up to 5% weight based on the total composition.

The effects on the lifetime and the stability (as defined above) are as follows:

| % Cl | L | S |
|---|---|---|
| 0 | 134 | 6.77 |
| 2 | 140 | 5.41 |
| 3 | 147 | 10.56 |
| 4 | 153 | 13.03 |

The line 0% corresponds ZBLYINC as given in Table 2 above (ie the bottom line thereof). The other lines show the effect on changing the stated amounts of fluoride into chloride. It will be noticed that the lifetime increased with chloride concentration but the stability for 2% chloride is less than for all fluoride. However 3% and 4% of chloride gave good stabilities as well as a high fluorescence lifetime.

In addition the composition ZBLYIN of Tables 1 and 2 (ie line 2) was modified to contain 4% weight of chloride based on the total composition. The fluorescence lifetime increased from 126 to 163 which is an excellent value. The stability was only slightly increased, ie from 3.41 (all fluoride) to 3.55 (mixed halide).

We claim:

1. A halide glass corrosion which composition consists of a host glass 0.001 to 4 weight % based on the host glass composition of an active dopant, wherein the host contains at least one halide of In and Y an at least 1 alkali metal halide characteristic in that:

(i) the total amount of the halide of In and Y is 1–10% and aluminium halide at a concentration between 0.0% and 0.2%; and (ii) tile total amount of alkali metal halides is 10–39% wherein all the percentages are molar percentages based on the total host glass composition.

2. A glass composition as in claim 1, wherein the total amount of alkali metal halides consists of at least 1% of each of a plurality of different alkali metal halides, said halides being derived from alkali metals, said alkali metals being selected from Na, Cs and Li.

3. A glass composition as in claim 1 wherein the amount of aluminium is substantially zero and the composition contains at least 1% of indium halide and at least 1% of yttrium halide.

4. A glass composition as in claim 1 which contains, in addition to the halides of alkali metals and Al, In, and Y, as specified, at least 40% of a zirconium halide at least 10% of a barium halide and at least 2% of a lanthanum halide.

5. A glass composition as in claim 1 wherein said active dopant is a trivalent ion of a rare earth.

6. A glass composition as in claim 5, wherein the active dopant is praseodymium and its concentration is 0.001 to 0.1 wt %.

7. A glass composition as in claim 1 which additionally contains at least one halide of lead, hafnium and thorium.

8. A glass composition as in claim 1 wherein the halide content is made up entirely of fluoride and chloride, the chloride content being less than 10% wt based on the total composition.

9. A glass composition as in claim 8, wherein the halide content is all fluoride.

10. A composition as in claim 9, wherein the host glass consists of the percentages $\alpha$, $\beta$, $\gamma$, $\delta$, $\Phi$, $\psi$, $\theta$, $\omega$, $\zeta$, $\mu$ and $\pi$ of the ingredients identified in the following tabulation:

| | | |
|---|---|---|
| $\alpha$ | % | $ZrF_4$ |
| $\beta$ | % | $BaF_2$ |
| $\gamma$ | % | $CaF_3$ |
| $\delta$ | % | $PbF_2$ |
| $\Phi$ | % | $HfF_4$ |
| $\Psi$ | % | $LiF$ |
| $\theta$ | % | $CsF$ |
| $\omega$ | % | $NaF$ |
| $\zeta$ | % | $AlF_3$ |
| $\mu$ | % | $YF_3$ |
| $\pi$ | % | $InF_3$ | wherein each of the ingredient percentages satisfies the quantitative relationships defined in tabular form below:

| minimum [MIN] | percentage amounts | maximum [MAX] |
|---|---|---|
| 60% | $\leq$ $\alpha + \beta \gamma + \delta + \phi$ | $\leq$ 90% |
| 45% | $\leq$ $+ \phi$ | $\leq$ 90% |
| 45% | $\leq$ $\alpha + \delta$ | $\leq$ 90% |
| 10% | $\leq$ $\omega + \theta \omega$ | $\leq$ 39% |
| 2:1 | = $(\Psi + \theta):\omega$ | = 1:2 |

| minimum [MIN] | percentage amounts | maximum [MAX] |
|---|---|---|
| 1% | $\leq$ $\zeta + \mu + \pi)$ | $\leq$ 10% |
| 0% | $\leq$ $\zeta$ | $\leq$ 1% |
| 0:10 | = $\zeta:(\mu + \pi)$ | = 1:10 |

11. A composition as in claim 10, wherein at least two of said host glass ingredient percentages $\psi$, $\theta$ and $\omega$ are greater than 5.

12. A composition as in claim 10, wherein each of said host glass ingredient percentages $\psi$, $\theta$ and $\omega$ is greater than 3.

13. A composition as in claim 10 wherein each of said host glass ingredient percentages $\mu$ and $\pi$ is greater than 1.

14. A composition as in claim 10, wherein said host glass ingredient percentage $\alpha$ is greater than 45 and less than 55.

15. A composition as in claim 10 wherein said host glass ingredient percentage $\zeta 0$.

16. A fibre waveguide having a fibre core made of a glass composition as specified in claim 1.

17. An optical amplifier including:
   a waveguide as in claim 16,
   an input port for connecting said waveguide to receive optical signals; and
   a pump for providing pump radiation into a core of the waveguide so as to provide power to sustain optical amplification by lasing activity.

18. A fluorochlorozircontate glass composition for use in an optical signal amplifier or in a laser which composition consists of a host glass and 0.001 to 4% wt, based on the host glass compositions of praseodymium and the host glass contains halides of the elements Zr, Ba, La, Y, In, Cs and Na subject to the conditions that:
   (i) the composition contains no aluminium; and
   (ii) the halide content is provided as 1–5% wt of chloride and that the remainder of said halides is provided as fluoride.

19. A composition as in claim 18, wherein the halide content is 3–4% wt.

20. A composition as in claim 16 having a mole ratio of In: Y within the range 2:3 to 3:2.

21. A composition as in claim 18 having a mole ratio Na:Cs within the range 5:1 to 1:3.

22. A composition as in claim 18, which additionally contains at least one halide selected from halides of Hf and Li.

23. A composition as in claim 18, which only contains halides of the elements Zr Ba, La, Y In, G and Na.

24. A method of amplifying telecommunication signals at a nominal wavelength of 1300 nm, said method comprising:
   providing said telecommunication signals into a glass composition as in claim 1 wherein an active dopant is praseodymium and
   simultaneously providing into said glass composition pump radiation at a nominal wavelength of 1020 nm whereby said pump radiation excites said praseodymium into an inverted state to generate more photons at 1300nm whereby said telecommunication signals are amplified.

* * * * *